Patented Nov. 16, 1926.

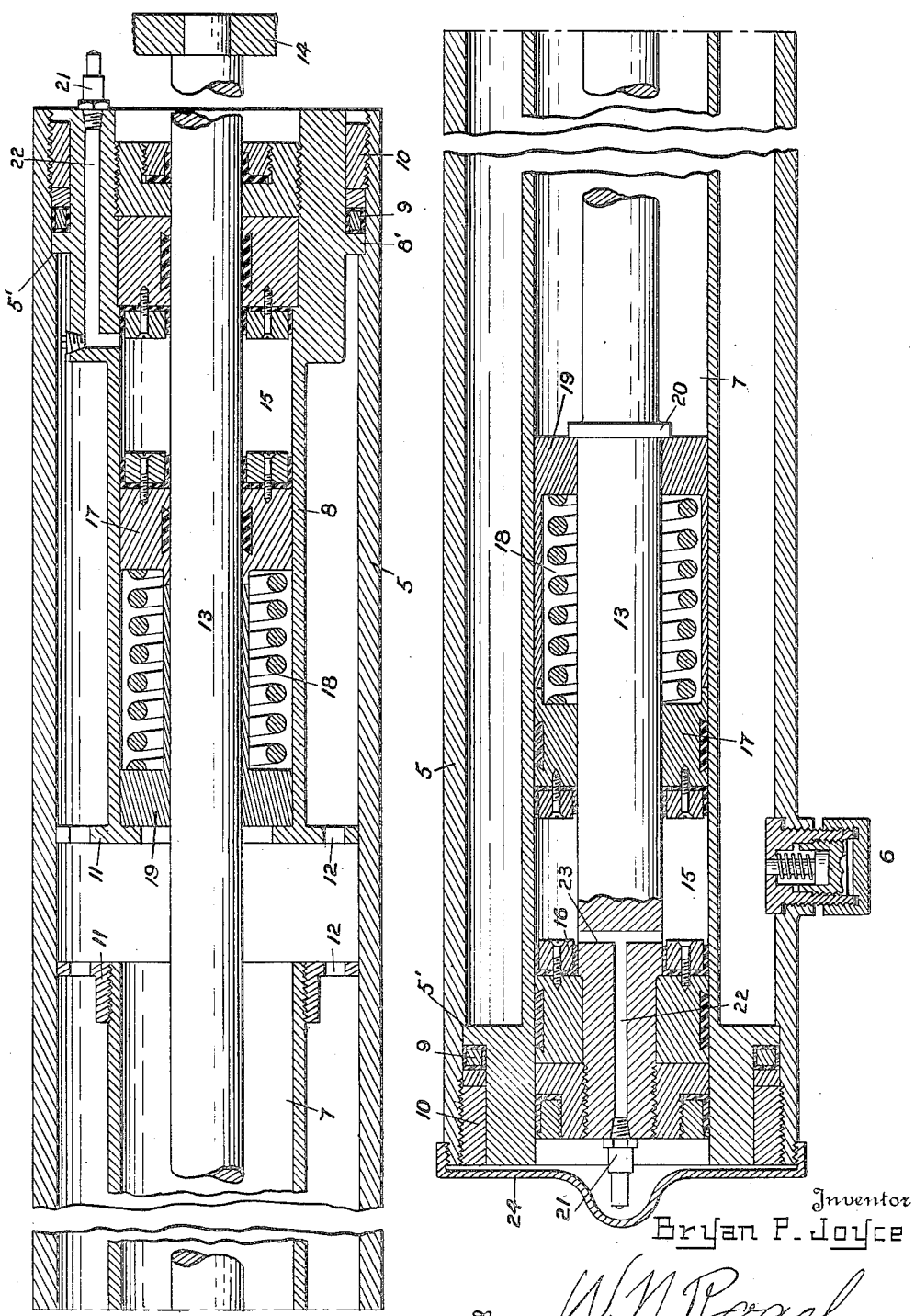

1,607,350

UNITED STATES PATENT OFFICE.

BRYAN P. JOYCE, OF DAVENPORT, IOWA.

PNEUMATIC RECUPERATOR FOR GUNS.

Application filed May 15, 1925. Serial No. 30,557.

This invention relates to a pneumatic recuperator for guns.

The principal object of the present invention is to provide a compact and light pneumatic recuperator of maximum capacity embodying a pair of concentric cylinders fabricated with open ends, the inner piston cylinder being enveloped by and capable of slight movement with respect to the outer cylinder which constitutes the pressure fluid reservoir. The piston cylinder is formed with an annular flange to cooperate with the forward end of the outer cylinder in establishing a movable joint and thereby more effectually preventing the escaping of fluid from the reservoir. The piston head consists of a special packing assembly which seals the forward end of the piston cylinder. This cylinder terminates short of the rear end of the outer cylinder to allow for introduction of a stuffing box flanged in like manner to the forward end of the piston cylinder to constitute a movable joint with the rear end of the enveloping cylinder, the piston head and stuffing box being both accessible through the open ends of the cylinders which facilitates assembly of these units and provides for the admission of a liquid which is used in establishing the seals.

To these and other ends, my invention consists in the construction, arrangement, and combination of elements, described hereinafter and pointed out in the claims forming a part of this specification.

The drawing is a longitudinal sectional view of a recuperator constructed in accordance with the invention.

Referring to the drawing by numerals of reference:

In carrying out the invention, the recuperator comprises an outer reservoir cylinder 5, which may be rigidly secured in any suitable manner to the cradle of a gun and is provided with a valve 6 for admitting a pressure fluid, conveniently nitrogen. Within the cylinder 5 and co-axial therewith is fitted a piston cylinder 7, open at both ends and terminating short of the rear end of the enveloping cylinder to allow for introduction of a stuffing box 8. The cylinder 7 and stuffing box 8 are shown formed with annular flanges 7' and 8' seated against shoulders 5' at either end of the outer cylinder. These units are capable of slight outward movement to compress packing 9—9 against end rings 10—10 in the cylinder 5. The adjacent ends of the cylinder and stuffing box are spaced and are provided with centering webs 11 formed with ports 12 whereby the pressure fluid reservoir may be established through practically the entire length of the outer cylinder.

Within the piston cylinder is a piston 13 attached in the usual manner to the lug 14 of the gun barrel and movable therewith during recoil and counterrecoil. The piston head, and likewise the stuffing box, which must be capable of effectually preventing the escape of the pressure fluid includes a chamber 15 for holding a fluid such as a lubricant under pressure and said chamber is established between a fixed packing 16 on the end of the piston rod and stuffing box and a movable packing 17 which separates the pressure mediums in the seal and the recuperator. The packing 17 is resiliently held by a helical spring 18, a function of which is to place the lubricant in the chamber 15 under greater pressure than the pressure of the fluid within the cylinder 5, confined between the movable packing 17 and a packing ring 19 which is assembled against an annular shoulder 20 on the piston rod and stuffing box. By this means the movable packing 17 may adjust itself to variations in pressure. The lubricant is conveniently introduced through a valve 21 in the end of the piston rod and the passages 22 and 23. Access to the valve is gained by removing the cap 24 which may be omitted from the structure, if desired.

The packing of the stuffing box includes the corresponding elements of the piston packing and is so numbered.

The recuperator operates in the usual manner, the pressure fluid being compressed by the piston during recoil of the gun and serving to restore the gun to battery.

I claim:

1. A pneumatic recuperator embodying an enveloping cylinder constituting a pressure fluid reservoir, end rings in said cylinder, a piston cylinder and stuffing box co-axial within said cylinder and provided with annular flanges near their outer ends, said enclosed members being spaced from each other and capable of limited movement with respect to the enveloping cylinder, packing interposed between the end rings and flanges, apertured centering webs on the adjacent ends of the enclosed member, a piston rod, a piston head including a fluid seal, an automatically adjustable packing separating said seal and the recuperator pressure fluid, a similar fluid seal and separating packing carried by the stuffing box, and means whereby fluid may be admitted to the seals through the respective ends of the piston head and stuffing box.

2. A pneumatic recuperator embodying an envelope cylinder constituting a pressure fluid reservoir, end rings in said cylinder, a piston cylinder and stuffing box co-axial within said cylinder and provided with annular flanges near their outer ends, said enclosed members being spaced from each other and capable of limited movement with respect to the enveloping cylinder, packing interposed between the end rings and flanges, apertured centering webs on adjacent ends of the enclosed members, a piston rod, a piston head including a fluid seal, a similar fluid seal established in the stuffing box, and means whereby fluid may be admitted to the seals through the respective ends of piston head and stuffing box.

3. A pneumatic recuperator embodying an enveloping cylinder constituting a pressure fluid reservoir, end rings in said cylinder, a piston cylinder and stuffing box co-axial within said cylinder and provided with annular flanges near their outer ends, said enclosed members being spaced from each other and capable of limited movement with respect to the enveloping cylinder, packing interposed between the end rings and flanges, apertured centering webs on adjacent ends of the enclosed members, and a piston working in said enclosed members.

4. A pneumatic recuperator embodying an enveloping cylinder constituting a pressure fluid reservoir, a piston cylinder and stuffing box co-axial within said cylinder and spaced from each other, said enclosed members provided with enlarged outer ends for establishing a movable joint with the ends of the enveloping cylinder, apertured centering webs on adjacent ends of the enclosed members whereby the pressure fluid may be contained between said members and the outer cylinder, a piston working in said enclosed members, a fluid seal established in the piston head and stuffing box, and means whereby fluid may be admitted to the seals through the respective ends of the piston head and stuffing box.

5. A pneumatic recuperator embodying an enveloping cylinder constituting a pressure fluid reservoir, a piston cylinder and stuffing box co-axial within said cylinder and spaced from each other, said enclosed members provided with enlarged outer ends for establishing a movable joint with the ends of the enveloping cylinder, apertured centering webs on adjacent ends of the enclosed members whereby the pressure fluid may be contained between said members and the outer cylinder, and a piston working in said enclosed members.

6. A pneumatic recuperator embodying an enveloping cylinder constituting a pressure fluid reservoir, a piston cylinder and stuffing box co-axial within said cylinder and spaced from each other, said enclosed members provided with enlarged outer ends for establishing a movable joint with the ends of the enveloping cylinder, and a piston working in said enclosed members.

7. A pneumatic recuperator embodying an enveloping cylinder constituting a pressure fluid reservoir, a piston cylinder within said cylinder forming a closure for one end thereof and having fluid communication therewith, a stuffing box forming a closure for the other end of the enveloping cylinder and spaced therefrom for the greater part of its length to increase the capacity of the reservoir, and a piston working in both of said enclosed members.

BRYAN P. JOYCE.